(12) United States Patent
Yarman

(10) Patent No.: US 8,391,564 B2
(45) Date of Patent: Mar. 5, 2013

(54) PROVIDING AN IMAGING OPERATOR FOR IMAGING A SUBTERRANEAN STRUCTURE

(75) Inventor: Can Evren Yarman, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 280 days.

(21) Appl. No.: 12/825,531

(22) Filed: Jun. 29, 2010

(65) Prior Publication Data

US 2011/0317934 A1   Dec. 29, 2011

(51) Int. Cl.
*G06K 9/00* (2006.01)
(52) U.S. Cl. .......................................... 382/109; 702/14
(58) Field of Classification Search .................. 382/109; 702/14
See application file for complete search history.

(56) References Cited

U.S. PATENT DOCUMENTS

| 6,027,447 | A  | * | 2/2000  | Li .................................. 600/447 |
| 6,904,368 | B2 | * | 6/2005  | Reshef et al. .................... 702/17 |
| 6,996,470 | B2 | * | 2/2006  | Kamps ............................. 702/17 |
| 8,060,312 | B2 | * | 11/2011 | Wang et al. ...................... 702/14 |
| 2009/0184958 | A1 |   | 7/2009  | Osypov et al. |
| 2011/0096627 | A1 | * | 4/2011  | Hill ................................ 367/73 |

OTHER PUBLICATIONS

Albertin, Uwe, et al., True-amplitude beam migration, SEG Int'l Exploration and 74th Annual Meeting, Oct. 10-15, 2004.
Bleistein, N., et al. Mathematics of Multidimensional Seismic Imaging, Migration, and Inversion, 2000, Springer-Verlan New York, Inc., New York, NY, United States of America.
Cerveny, V., Seismic Ray Theory, 2001, Cambridge University Press, New York, NY, United States of America.
Ferreira, Carlos A. S., et al., SEG/New Orleans 2006 Annual Meeting, 2006, pp. 2614-2618.
Gray, Samuel H., Gaussian beam migration of common-shot records, Geophysics, Jul. 6, 2005, pp. S71-S77, vol. 70, No. 4.
Haldorsen, j AKOB B.U., Multichannel Wiener deconvolution of vertical seismic profiles, Geophysics, Oct. 1994, pp. 1500-1511, vol. 59, No. 10.
Hill, N. Ross, Gaussian beam migration, Geophysics, Nov. 1990, pp. 1416-1428, vol. 55, No. 11.
Hill, N. Ross, Prestack Gaussian-beam depth migration, Geophysics, Jul. 8, 2001, pp. 1240-1250, vol. 66, No. 4.
Liu, Jonathan, Multi-arrival Kirchhoff beam migration, SEG Las Vegas 2008 Annual Meeting, 2008, pp. 2311-2315.
Nowack, Robert L., Gaussian beam migration for sparse common-shot and common receiver data, SEG, Expanded Abstracts, 2003, pp. 1114-1117, vol. 22(1).
Prostasov, M. I., True-Amplitude Seismic Imaging, , Doklady Earth Sciences, 2006, pp. 441- 445, vol. 407A, No. 3.
Symes, William W., et al., Migration velocity analysis and waveform inversion, 2008, Geophysical Prospecting, pp. 765-790, vol. 56.
Virgilio, Massimo, Gaussian beam migration: prestack, common-shot, TTI, true amplitude in angular domain, 2008, SEG, Expanded Abstracts, SEG, Expanded Abstracts, pp. 2236-2240, 27(1).
Wang, Bin, er al., Advances in velocity model-building technology for subsalt imaging, Geophysics, 2008, pp. VE173-VE181.
Yilmaz, Oz, Seismic Data Analysis, SEG, 2000. vol. 1-vol. 2.

(Continued)

*Primary Examiner* — Tom Y Lu

(57) ABSTRACT

To perform imaging of a subterranean structure, an imaging operator is generated through the design of a weight, where the weight is computed according to a design criterion, where the design criterion is selected from the group consisting of: (1) the imaging operator provides a true amplitude image; (2) the imaging operator minimizes mean square error; and (3) the imaging operator corresponds to a least squares inverse of a forward modeling operator. The weighted filter as defined by the computed weights is applied to produce an image of a subterranean structure.

17 Claims, 2 Drawing Sheets

OTHER PUBLICATIONS

Beylkin, G., Imaging of discontinuities i n the inverse scattering problem by inversion of a causal generalized Radon transform, J. Math. Phys. Jan. 1985, pp. 99-108, vol. 26.

De Hoop, Maarten V., et al., GRT/AVA migration/inversion in anisotropic media, SPIE, 1994, pp. 15-27, vol. 2301.

Miller, D. E., et al., Multiparameter inversion, dip-moveout, and the generalized radon transform, Geophysical Inversion, SIAM, 989/Sep. 27-29, 1990.

Miller, D.E., et al., A new slant on seismic imaging, Migartion and Integral geometry, Geophysics, Jul. 1987 pp. 943-964, vol. 52, No. 7.

Brandsberg-Dahl, Sverre, et al., Focusing in dip and AVA compensation on scattering-angle/azimuth common image gathers, Geophysics, Jan. 2, 2003, pp. 232-254, vol. 68, No. 1.

Stein, Elias M., Harmonic Analysis: Real-Variable Methods, Orthogonality and Oscillatory Integrals, 1993, Princeton University Press, Princeion, NY, United States of America.

* cited by examiner

PROVIDING AN IMAGING OPERATOR FOR IMAGING A SUBTERRANEAN STRUCTURE

BACKGROUND

When performing surveying of a subterranean structure for identifying subterranean bodies of interest (e.g., hydrocarbon reservoirs, fresh water aquifers, gas injection zones, etc.), data points are collected by survey receivers in response to a stimulus. The survey receivers can be electromagnetic (EM) receivers or seismic receivers. The stimulus can be produced by a source, such as an EM source or a seismic source.

Imaging of a subterranean structure is based on building a forward modeling operator. The forward modeling operator relates physical properties of the subterranean structure to measurement data collected by a survey spread that includes survey receivers. Once formed, the forward modeling operator can be used to build an imaging operator for predicting a quantity of interest associated with a subterranean structure, by applying the imaging operator on input data, such as measured data and/or prior information.

Challenges associated with computing imaging operators include accuracies of forward modeling operators and complexities of deriving such imaging operators.

SUMMARY

In general, according to an embodiment, a method is provided for deriving at least one weight to build an imaging operator for imaging a subterranean structure. The at least one weight is computed according to a criterion, where the criterion is selected from among: (1) the at least one weight is configured to provide an imaging operator that creates true amplitude image; (2) the at least one weight is configured to provide an imaging operator that minimize mean square error; and (3) the at least one weight is configured to provide an imaging operator that approximates a least squares inverse of a forward modeling operator (to image a subterranean structure). The computed at least one weight is then used to build the imaging operator which is used to produce an image of the subterranean structure.

Other or alternative features will become apparent from the following description, from the drawings, and from the claims.

BRIEF DESCRIPTION OF THE DRAWINGS

Some embodiments are described with respect to the following figures.

DETAILED DESCRIPTION

In general, filtering techniques are provided for producing an imaging operator for use in imaging a subterranean structure. The imaging operator is defined at least in part by at least one weight. The at least one weight is computed according to a design criterion, which is selected from among the following: (1) the at least one weight is configured to provide an imaging operator that creates a true amplitude image; (2) the at least one weight is configured to provide an imaging operator that minimizes mean square error; and (3) the at least one weight is configured to provide an imaging operator that approximates a least squares inverse of a forward modeling operator. The at least one weight is used to build the imaging operator that is used to produce an image of the subterranean structure.

Figure 1:
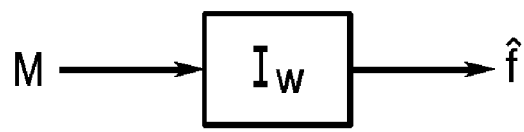
FIG. 1 illustrates computation of an image using an imaging operator generated according to some embodiments.

Use of an imaging operator is illustrated in a simplified diagram shown in FIG. 1. The imaging operator (defined by at least one weight computed using techniques according to some embodiments) is represented by $I_w$ in FIG. 1. To use the imaging operator $I_w$, measurement data (M) is provided as input to the imaging operator $I_w$. Based on the input, the imaging operator $I_w$ produces an image, represented as $\hat{f}$, which represents a quantity of interest of a subterranean structure. From the produced image, survey personnel can determine whether the subterranean structure contains any bodies of interest.

The techniques of producing an imaging operator according to some embodiments can be used in any one of several contexts, including the following: Gaussian beam migration, prestack depth migration (also referred to as Kirchhoff migration); and others.

In Gaussian beam migration, imaging of a subterranean structure is obtained by using Gaussian beams as a forward modeling operator. More precisely, the scattering potential, or reflectivity, of the subterranean structure is imaged using a Gaussian beams representation of the forward modeling operator. Gaussian beam migration enables imaging of relatively complex geologic structures without dip limitation, and with accuracy comparable to that of wave equation migration and efficient comparable to that of Kirchhoff migration. In some embodiments, a midpoint-offset domain Gaussian beam migration filtering technique is provided, which provides a filter that can produce a true amplitude image.

A true amplitude image of a quantity of interest is the image obtained from measurement data whose edge locations and strengths agree with an ideal/real quantity. The ideal/real quantity is the actual quantity that exists in the subterranean structure. Examples of a quantity of interest associated with a subterranean structure include formation reflectivity, scattering potential, resistivity, rock porosity, and so forth.

Designing weights according to some embodiments when applied in the prestack depth migration (Kirchhoff migration) context can produce a scattering potential, or similarly reflectivity image with true amplitude when composed with an adjoint of the forward modeling operator. The imaging operator that is produced by weight design techniques acts on measurement data (collected using survey receivers) based on local slant-stack transforms in source and receiver coordinates and based on convolution in time. The local slant-stack and convolution arrangement naturally provides a framework for parallel computations and for relatively efficient implementations. In the prestack depth migration context, a filter produced according to some embodiments can also provide a true amplitude image. For prestack depth migration, the filter can be a spatially varying space-wavenumber-time-frequency filter.

Figure 2:
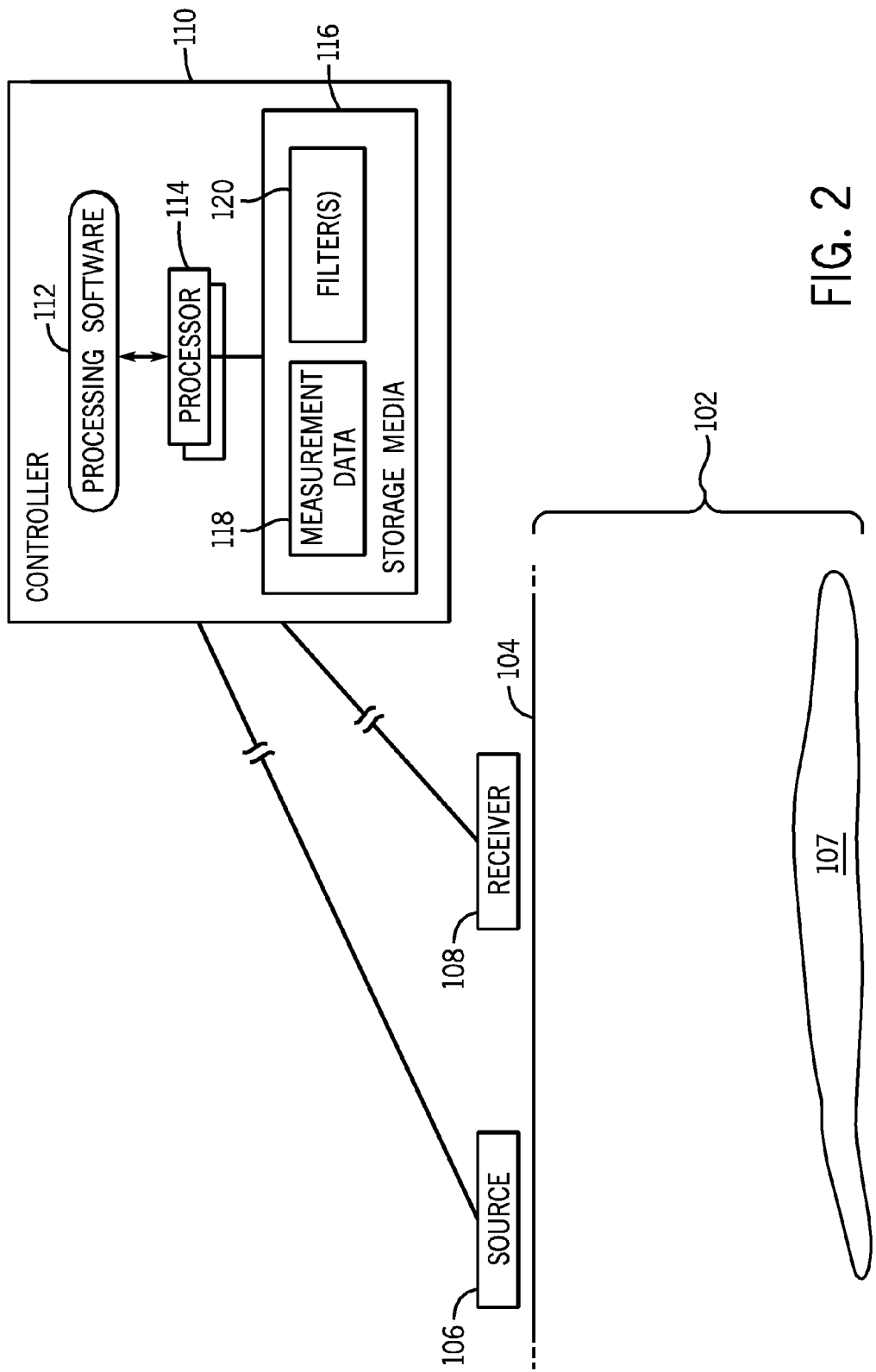
FIG. 2 is a schematic diagram of an example arrangement that includes a survey source, a survey receiver, and a controller incorporating components according to some embodiments.

FIG. 2 illustrates an example arrangement in which techniques according to some embodiments can be employed. A survey spread depicted in FIG. 2 includes a survey source 106 and a survey receiver 108 deployed on a ground surface 104. Underneath the ground surface 104 is a subterranean structure 102 that has one or more bodies 107 of interest, such as hydrocarbon reservoirs, freshwater aquifers, gas injection zones, and so forth. Although just one survey source 106 and one survey receiver 108 is shown in the example of FIG. 1, note that a typical implementation would include multiple sources and multiple receivers. The ground surface 104 can be a land surface or a bottom surface in a marine environment (e.g., seafloor).

The survey source 106 and survey receiver 108 can be connected to a controller 110 which can be a central recording station. The controller 110 can be implemented with a computer system as well as with other components. The controller 110 has processing software 112 that can apply filtering techniques according to some embodiments. The processing software 112 is executable on one or plural processors 114. The one or plural processors 114 are connected to storage media 116, which can be implemented with disk-based storage media and/or integrated circuit or semiconductor storage media.

The storage media 116 stores measurement data 118 acquired by survey receivers, such as survey receiver 108. Moreover, the storage media 116 stores one or more filters 120 produced by filtering techniques according to some embodiments. The filter(s) 120 can be produced by the processing software 112, based on the measurement data 118.

The following discussion has two sections: a first section relates to Gaussian beam migration, while a second section relates to prestack depth migration (Kirchhoff migration).

Gaussian Beam Migration

In accordance with some embodiments, a weighted adjoint of the forward modeling operator is the imaging operator and provides true amplitude Gaussian beam migration of midpoint-offset sorted measurement data. A weighted adjoint operator designed according to some embodiments has the characteristic that the composition of the weighted adjoint operator with the forward modeling operator from right will approximate the identity operator. In other words, assume F represents the forward modeling operator, $F_w^*$ represents the weighted adjoint, and $I_w$ represents the imaging operator. Then $I_w = F_w^*$ and $F_w \cdot F$ would produce the identity operator (I). The technique according to some embodiments is an analytic technique that can accommodate statistical information within its framework. The technique is optimal in the least square sense in the absence of noise in measurement data, and optimal in the minimum mean square error sense in the presence of noise in measurement data. Also, the notion of generalized semblance can be used in some embodiments. The MMSE (minimum mean square error) inverse of the forward modeling operator is computed using generalized semblance. When generalized semblance is used, the statistics relating to noise are no longer required to compute the MMSE inverse, which simplifies computations. Moreover, the generalized semblance can be treated as a depth oriented wavenumber gather which may be used as a focusing tool for tomography.

Gaussian beam migration involves expressing a Green's function using a discrete number of Gaussian beams. The following three approximations are used in some embodiments.

First, the Green's function $G(r,r',\omega)$ is approximated in terms of the Gaussian beams $u_{GB}(r,r',p',\omega)$:

$$G(r, r', \omega) \approx \frac{i\omega}{2\pi} \int u_{GB}(r, r', p', \omega) \frac{dp_{x'} dp_{y'}}{p_{z'}}, \quad \text{(Eq. 1)}$$

where $u_{GB}(r,r',p',\omega)$ is given by $$u_{GB}(r,r',p,\omega) = A(r,r',p)\exp(i\omega T(r,r',p)). \quad \text{(Eq. 2)}$$

Here $A(r,r',p)$ is the complex amplitude and $T(r,r',p)$ is the complex travel time. The vectors r and r' are coordinates in space $(r,r' \in R^3)$, $\omega$ is frequency, p and p' are initial beam directions $(p,p' \in S^2)$.

Second, for certain lattice points L, the following condition applies:

$$1 \approx \frac{\sqrt{3}}{4\pi} \left|\frac{\omega}{\omega_l}\right| \left(\frac{a}{w_l}\right)^2 \sum_L \exp\left[-\left|\frac{\omega}{\omega_l}\right| \frac{|r-L|^2}{2w_l^2}\right] \quad \text{(Eq. 3)}$$

Third, for small r", $$u_{GB}(r,r'+r'',p,\omega) \approx u_{GB}(r,r',p,\omega)e^{-ip \cdot r''}. \quad \text{(Eq. 4)}$$

The measurement data at receiver at location $r_d$ due to a source at location at $r_s$ is modeled by $$D(r_d,r_s,t) = \int \omega^2 P(\omega)e^{-i\omega t} \int dr' f(r') G(r',r_s,\omega) G(r_d,r',\omega) d\omega, \quad \text{(Eq. 5)}$$

where f(r) is referred to as the scattering potential, and $P(w) = \int p(t)e^{-i\omega t}dt$ is the Fourier transform of the source wavelet. Using the midpoint-offset representation $$r_m = (r_d + r_s)/2, \quad h = (r_d - r_s)/2, \quad \text{(Eq. 6)}$$

and the Gaussian beam representation of the Green's function, the measurement data can be expressed as:

$$D(r_m + h, r_m - h, t) = \quad \text{(Eq. 7)}$$

$$\int \omega^2 P(\omega)e^{i\omega t} f(r') G(r', r_m - h, \omega) G(r', r_m + h, \omega) dr' d\omega \approx$$

$$\int \omega^2 P(\omega)e^{i\omega t} f(r') \left[\frac{i\omega}{2\pi}\right]^2 u_{GB}(r', r_m - h, q^s, \omega)$$

$$u_{GB}(r', r_m + h, q^d, \omega) \times \frac{dq_x^s dq_y^s}{q_z^s} \frac{dq_x^d dq_y^d}{q_z^d} dr' d\omega.$$

Eq. 7 can be approximated by:

$$D(r_m + h, r_m - h, t) \approx \quad \text{(Eq. 8)}$$

$$\sum_{L'} \int \omega^2 P(\omega)e^{i\omega t} f(r') \left[\frac{i\omega}{2\pi}\right]^2 \left[\frac{\sqrt{3}}{4\pi} \left|\frac{\omega}{\omega_l}\right| \left(\frac{a}{w_l}\right)^2\right]$$

$$\exp\left[-\left|\frac{\omega}{\omega_l}\right| \frac{|L' - r_m|^2}{2w_l^2}\right] \times u_{GB}(r', r_m - h, q^s, \omega)$$

$$u_{GB}(r', r_m + h, q^d, \omega) \frac{dq_x^s dq_y^s}{q_z^s} \frac{dq_x^d dq_y^d}{q_z^d} dr' d\omega$$

The forward modeling operator F is defined by the right hand side of Eq. 8, i.e., $Ff(r_m,h,t) \approx D(r_m+h,r_m-h,t)$. For true amplitude imaging, techniques according to some embodiments design a left inverse of F.

The strategy for finding a left inverse of F and forming Gaussian beam migration images is to design a weighted version of the adjoint of the forward operator F. In this regard, the weighted adjoint operator $F_w^*$ (the imaging operator designed according to some embodiments) is defined by $$F_w^* M(r) \approx \sum_L \int \omega^2 P^*(\omega) e^{-i\omega t} \left[\frac{-i\omega}{2\pi}\right]^2 \left[\frac{\sqrt{3}}{4\pi} \left|\frac{\omega}{\omega_l}\right| \left(\frac{a}{w_l}\right)^2\right] \times \quad \text{(Eq. 9)}$$

-continued $$\exp\left[-\left|\frac{\omega}{\omega_l}\right|\frac{|L-r_m|^2}{2w_l^2}\right]w_L(\omega, p^s+p^d, h, r) \times$$

$$M(r_m+h, r_m-h, t)u^*_{GB}(r, r_m-h, p^s, \omega)$$

$$u^*_{GB}(r, r_m+h, p^d, \omega) \times \frac{dp^s_x dp^s_y}{p^s_z}\frac{dp^d_x dp^d_y}{p^d_z}dtdr_m dh\, d\omega,$$

where $M(r_d, r_s, t)$ denotes measurement data. Note that for $w_L=1$, $F_w^*$ is equal to the adjoint of the forward modeling operator F.

The weights $w_L$ are calculated as follows:

$$w_L(\omega, p^m, h, r) = \int w_c(\xi, r'')e^{-i(\omega\nabla_r Th^R(r,L,p^m)-\xi)\cdot(r-r'')}dr''d\xi. \quad\text{(Eq. 10)}$$

In the noise-free scenario, it is assumed that the measurement data is given by Eq. 8:

$$M(r_m, h, t) = D(r_m+h, r_m-h, t). \quad\text{(Eq. 11)}$$

Thus $w_L$ (weights of the imaging operator $I_w$) is computed such that $F_w^*$ is an approximate (least squares) inverse of F, i.e., $F_w^* F \approx I$. In some embodiments, with the choice of $$w_c(\zeta, r) = \int\int [\tilde{b}(r+r', \zeta')]^{-1} e^{-i\zeta \cdot r'} dr', \quad\text{(Eq. 12)}$$

$F_w^* F f \approx f$ is provided. Here $$\tilde{b}(r, \zeta) = \sum_L \int \left[\frac{\sqrt{3}}{2}a^2\right]\left\|\omega^2 P(\omega)\left[\frac{-i\omega}{2\pi}\right]^2\right\|^2 \times \quad\text{(Eq. 13)}$$

$$\left|\hat{A}_h(\omega, r, L, p^m)\right|^2 e^{i(\omega\nabla_r T_h^R(r,L,p^m)-\zeta)\cdot r'} dp^m_x dp^m_y dhd\omega dr',$$

with $\hat{A}_h(\omega,r,L',q^m) = A_h(r,L',q^m)\exp(\omega T_h^\Im(r,L',q^m))$. Also $A_h(r',L',q^m)$ and $T_h = iT_h^\Im + iT_h^\Re$ are the complex amplitudes and travel times, respectively.

Thus, in the noise-free scenario in which measurement data is noise free, the weighted adjoint operator (as represented by $F_w^*$) is a least squares inverse of the forward modeling operator (F).

In the presence of noise (noisy scenario), it is assumed that the measurement data is corrupted with additive noise and obey the following model:

$$M(r_m, h, t) = D(r_m+h, r_m-h, t) + n(r_m, h, t). \quad\text{(Eq. 14)}$$

Similar to the noiseless case, the image is formed using weighted adjoint operator $F_w^*$ (the imaging operator $I_w$ according to some embodiments), where this time the weights are designed such that the minimum mean square error J(w):

$$J(w) = \int E[|F_w^* M(r) - f(r)|^2] dr, \quad\text{(Eq. 15)}$$

is minimized. Here $\|f\|_2^2 = \int |f(r)|^2 dr$ denotes the $L^2$ norm and E denotes statistical expectation.

It is assumed that the noise is zero mean and is uncorrelated from D and can be modeled as a second order stationary process in time that is locally uncorrelated in space. Furthermore, it is assumed that the scattering potential is second order stationary with power spectrum $S_f$.

With the choice of $$w_c(\zeta, r) = \quad\text{(Eq. 16)}$$

$$\int\left[\int \frac{\tilde{b}^*(r+r',\zeta')S_f(\zeta')}{|\tilde{b}(r+r',\zeta')|^2 S_f(\zeta') + \tilde{b}_n(r+r',\zeta')} e^{i\zeta'\cdot r'}d\zeta'\right] e^{-i\zeta\cdot r'}dr',$$

J(w) is minimized. Here $\tilde{b}(r,\zeta)$ is defined as in Eq. 13 and $$\tilde{b}_n(r, \zeta) = \sum_L \int \left|\omega^2 P^*(\omega)\left[\frac{-i\omega}{2\pi}\right]^2\left[\frac{\sqrt{3}}{4\pi}\left|\frac{\omega}{\omega_l}\right|\left(\frac{a}{w_l}\right)^2\right]\right|^2 \quad\text{(Eq. 17)}$$

$$S_n(\omega, L, h, \omega p_m) \times |\hat{A}_h(\omega, r, L, p^m)|^2$$

$$\left|\int \exp(i(\omega\nabla_r T_h^R(r, L, p^m) - \zeta)\cdot r')dr'\right|^2 \times$$

$$dp^m_x dp^m_y dh\, d\omega,$$

where $S_n$ is referred to as the localized power spectrum of n (noise). One can also think $\tilde{b}(r,\zeta)$ as the propagated noise spectrum observed at r.

Alternatively, one can use the notion of generalized semblance to compute Eq. 16 and eliminate the need for $\tilde{b}_n(r,\zeta)$ and $S_f(\zeta)$ as follows:

$$w_c(\zeta, r) = \int\left[\int \frac{\tilde{b}^*(r+r',\zeta')}{|\tilde{b}(r+r',\zeta')|^2} S(r+r', \zeta') e^{i\zeta'\cdot r'}d\zeta'\right] e^{-i\zeta\cdot r'}dr', \quad\text{(Eq. 18)}$$

where $S(r,\zeta)$ is the generalized semblance defined by $$S(r, \zeta) = \frac{\left|\int E[F^*_{w(\zeta,r)} M(r')]dr'\right|^2}{\int E[|F^*_{w(\zeta,r)} M(r')|^2]dr'}. \quad\text{(Eq. 19)}$$

with $w_{(r',\zeta')}(\xi, r) = \exp[i(\xi-\xi')\cdot(r'+r)]$.

When generalized semblance is used, the statistics relating to noise are no longer required to compute the MMSE (minimum mean square error) inverse. This allows for more efficient computation of the weighted adjoint operator ($F_w^*$).

The foregoing has discussed formation of the weighted adjoint operator $F_w^*$. The following describes usage of the weighed adjoint operator once it has been derived.

Using Eq. 9, the image $\hat{f}(r)$ to be produced is derived from input measurement data M(r) and the weighted adjoint operator $F_w^*$ according to the following:

$$\hat{f}(r) = F_w^* M(r) \approx \sum_L \int \omega^2 P^*(\omega) e^{-i\omega t}\left[\frac{-i\omega}{2\pi}\right]^2\left[\frac{\sqrt{3}}{4\pi}\left|\frac{\omega}{\omega_l}\right|\left(\frac{a}{w_l}\right)^2\right] \quad\text{(Eq. 20)}$$

$$\exp\left[-\left|\frac{\omega}{\omega_l}\right|\frac{|L-r_m|^2}{2w_l^2}\right] \times w_L(\omega, p^s+p^d, h, r)$$

$$u^*_{GB}(r, r_m-h, p^s, \omega)u^*_{GB}(r, r_m+h, p^d, \omega) \times$$

$$M(r_m+h, r_m-h, t)\frac{dp^s_x dp^s_y}{p^s_z}\frac{dp^d_x dp^d_y}{p^d_z}dtdr_m dh\, d\omega,$$

which, by using the identity and change of variables $r_m \to L + r_m$, $p^m = p^s + p^d$ and $p^h = p^d - p^s$, becomes $$\hat{f}(r) \approx \sum_L \int \omega^2 P^*(\omega) e^{-i\omega t}\left[\frac{-i\omega}{2\pi}\right]^2\left[\frac{\sqrt{3}}{4\pi}\left|\frac{\omega}{\omega_l}\right|\left(\frac{a}{w_l}\right)^2\right] \quad\text{(Eq. 21)}$$

-continued $$\exp\left[-\left|\frac{\omega}{\omega_l}\right|\frac{|r_m|^2}{2w_l^2}\right] \times w_L(\omega, p^m, h, r)$$

$$\hat{A}_h^*(\omega, r, L, p^m)\exp(i\omega T_h^R(r, L, p^m))e^{i\omega p^m \cdot r_m} \times$$

$$M(L+r_m+h, L+r_m-h, t)dp_x^m dp_y^m dt dr_m dh d\omega$$

Eq. 21 is used to form a target image $\hat{f}_h(r)$ representing a subterranean structure. The image $\hat{f}_h(r)$ is produced using the following procedure:

1. Sort the data in midpoint and offset:

$$S_1(r_m, t, h) = M(r_m+h, r_m-h, t).$$

2. Take the Fourier transform of D h($r_m$,t) with respect to t:

$$S_2(r_m, \omega, h) = \int S_1(r_m, t, h)e^{-i\omega t}dt.$$

3. Match filter with the transmitter waveform:

$$S_3(r_m, \omega, h) = S_2(r_m, \omega, h)P^*(\omega).$$

4. Apply Gaussian taper at each beam center L:

$$S_4(r_m, \omega, L, h) = S_3(L+r_m, \omega, h)\exp\left[-\left|\frac{\omega}{\omega_l}\right|\frac{|r_m|^2}{2w_l^2}\right].$$

5. Take 2D Fourier transform with respect to $r_m$:

$$S_5(k_m, \omega, L, h) = \int S_4(r_m, \omega, L, h)e^{ik\cdot r_m}dr_m.$$

6. Filter in the ω–k domain with modified complex amplitudes and $w_L$:

$$S_6(\omega, p^m, L, h, r) = S_5(\omega p^m, \omega, L, h)A_h^*(\omega, r, L, p^m)w_L(\omega, p^m, h, r).$$

7. Take inverse Fourier transform with respect to time:

$$S_7(t, p^m, L, h, r) = \int S_6(\omega, p^m, L, h, r)e^{i\omega t}d\omega.$$

8. Evaluate at real travel times:

$$S_8(r, p_m, L, h) = S_7(T_h^R(r, L, p^m), p^m, L, h, r).$$

9. Stack over all beam direction, beam centers:

$$\hat{f}_h(r) = \int \sum_L S_8(r, p_m, L, h)dp^m.$$

At this point one can either perform velocity analysis over the image volume $\hat{f}_h(r)$ by looking at its flatness with respect to surface offset h, or form the image by stacking:

$$\hat{f}(r) = \int \hat{f}_h(r)dh.$$

According to the foregoing, a true amplitude Gaussian beam migration technique is provided, which relies on the design of weighted adjoint operators as imaging operators for the inversion of the forward modeling operator. The weighted adjoint operators are designed for both the noise-free and noisy scenarios. In the presence of noise, the weighted adjoint operator minimizes the mean square error, whereas in the noise-free scenario, the weighted adjoint operator simplifies to the least squares inverse of the forward modeling operator.

Prestack Depth Migration

In accordance with some embodiments, in the prestack depth migration context, a true-amplitude prestack depth migration technique is provided that includes a spatially varying space-wavenumber-time-frequency filtering technique. The imaging operator for prestack depth migration according to some embodiments is designed as follows.

Such an imaging operator is derived from a composition of a filtering operator with the adjoint of the forward modeling operator and has the characteristic that the composition of the imaging operator with the forward modeling operator from right will approximate the identity operator. In other words, assume that F represents forward modeling operator, $I_w$ represents the imaging operator, F* represents the adjoint of F, and W represents the filtering operator. Then $I_w = F^* \cdot W$ and $I_w \cdot F$ would produce the identity operator (I). The imaging operator formulation also can include the transmitted source wavelet in an approximation of the integral in computation of the adjoint of the forward modeling operator.

Let F be the forward modeling operator that maps scattering potential f to pressure data p:

$$Ff(x_s, x_r, t) = m(x_s, x_r, t) = \int \omega^2 P(\omega) A(x_s, x_r, y) e^{i2\pi\omega(t-\phi(x_s, x_r, y))} f(y) dy d\omega, \quad \text{(Eq. 22)}$$

and let F* be the adjoint of F:

$$F^*m(y) = \int \omega^2 P^*(\omega) A^*(x_s, x_r, y) e^{-i2\pi\omega(t-\phi(x_s, x_r, y))} m(x_s, x_r, t) dx_s dx_r dt d\omega, \quad \text{(Eq. 23)}$$

In the above, m(x,x',t) represents ideal noise-free measurement data, $x_s$ represents a coordinate (position) of the survey source, $x_r$ represents a coordinate (position) of the survey receiver, t represents time, A(x,x',y) represents the adjoint of the combined amplitude function A(x,x',y), and P*(ω) represents the complex conjugate of P(ω), which is expressed as $P(\omega) = \int p(t)e^{-2\pi\omega t}dt$, where p(t) is the source wavelet. (The symbol * is used for complex conjugation as well as adjoint of operators—the meaning will be clear from the context.)

The filtering operator W is designed such that $$f(y) \approx F^*Wm(y). \quad \text{(Eq. 24)}$$

Here ≈ denotes approximation up to the leading order term. W is restricted to the following form:

$$Wm(x_s, x_r, t, y) = \int e^{i2\pi[s\cdot(x'-x_s)+k_r\cdot(x_r'-x_r)-\omega(t'-t)]}\chi_s(|x_s-x_s'|)\chi_r$$
$$(|x_r-x_r'|) \times w(x_s, x_r, t, k_s, k_r, \omega, y)m(x_s', z_s, x_r', z_r, t')$$
$$dx_s dk_s dx_r' dk_r dt' d\omega, \quad \text{(Eq. 25)}$$

where $\chi_{s/r}(|x|)$ are window functions centered around zero and integrate to unity, i.e., $\int \chi_{s/r}(|x|)dx=1$, and w is the weight of the filtering operator to be determined below. Here $x_{s/r}$ denotes the lateral and horizontal source and receiver coordinates, and $z_{s/r}$ denote the depth coordinates of the source and receiver locations.

Eq. 25 defines the filtering operator W as a spatially dependent space-time-wavenumber-frequency filter. Due to the windowing functions the filtering is localized in source and receiver locations.

Furthermore, it is assumed that the filter (also referred to as a "weight") $w(x_s, x_r, t, k_s, k_r, \omega, y)$ is a reparameterization of a standard-symbol of a pseudo-differential operator:

$$w(x_s, x_r, t, k_s, k_r, \omega, y) = w_{(x_s, x_r, y)}(\omega)\delta(k_r - \omega\nabla_{x_r}\phi(x_s, z_s, x_r, z_r, y)) \times \delta(k_s - \omega\nabla_{x_s}\phi(x_s, z_s, x_r, z_r, y)), \quad \text{(Eq. 26)}$$

where $w_{(x_s, x_r, y)}(\omega) = w_\Psi(\xi, y)$ with $\xi = -\omega\nabla_y\phi(x_s, x_r, y)$.

For ease of manipulation and computation of the filter $w(x_s, x_r, t, k_s, k_r, \omega, y)$, a compound-symbol representation of $w_\Psi(\xi, y)$ is used:

$$w_\Psi(\xi, y) = \int v_1(y-y', y')e^{i2\pi\xi\cdot(y-y')}dy'.$$

Eq. 26 can be rewritten as $$w(x_s, x_r, t, k_s, k_r, \omega, y) = \int v_1(y-y', y')e^{i2\pi\xi\cdot(y-y')}dy'\delta(k_r - \omega\nabla_{x_r}\phi$$
$$(x_s, z_s, x_r, z_r, y)) \times \times \delta(k_s - \omega\nabla_{x_s}\phi(x_s, z_s, x_r, z_r, y)). \quad \text{(Eq. 27)}$$

There are other compound-symbol representations of a pseudo-differential operator, such as Weyl representation. However, this particular choice of compound-symbol representation is easy to manipulate and design.

With the choice of $$v_1(y-y',y') = \int\int[\int e^{i2\pi 5 \cdot y''}[\int e^{-i2\pi\xi \cdot y''} a(x_s, x_r, \omega, y) dx_s dx_r d\omega] dy''] ^{-1} e^{-i2\pi k \cdot (y-y')} dk, \quad \text{(Eq. 28)}$$

where $$a(x_s, x_r, \omega, y) = |A(x_s, x_r, y)|^2 \omega^4 |P(\omega)|^2, \quad \text{(Eq. 29)}$$

W satisfies Eq. 24 and gives a true-amplitude image.

Although the imaging operator is designed for adjoint imaging, the imaging operator can equivalenity be designed for matched-filtered backprojection imaging, i.e., $B_p Wm(y) \approx f(y)$, where $$B_p m(y) = \int m(x_s, x_r, \tau + t = \phi(x_s, x_r, y)) p^*(\tau) d\tau dx_s dx_r, \quad \text{(Eq. 30)}$$

In this case, it is sufficient to set $a(x_s, x_r, \omega, y) = A(x_s, x_r, y) \omega^2 |P(\omega)|^2$ in the computation of the filter.

Once the filtering operator W is derived as discussed above, then the imaging operator can be computed by combining the filtering operator W with the forward modeling operator F, as $I_w = F^* \cdot W$.

To apply the imaging operator $I_w$ designed above, $$Wm(x_s, x_r, t, y) = \quad \text{(Eq. 31)}$$
$$\int w_{(x_s, x_r, y)}(\omega) e^{i2\pi \begin{bmatrix} \omega \nabla_{x_s} \phi(x_s, x_r, y) \cdot (x_s' - x_s) + \\ \omega \nabla_{x_r} \phi(x_s, x_r, y) \cdot (x_r' - x_r) - \omega(t' - t) \end{bmatrix}} \times \chi_s(|x_s - x_{s'}|)$$
$$\chi_r(|x_r - x_r'|) m(x_s', z_s, x_r', z_r, t') dx_s' dx_r' dt' d\omega.$$

Figure 3:
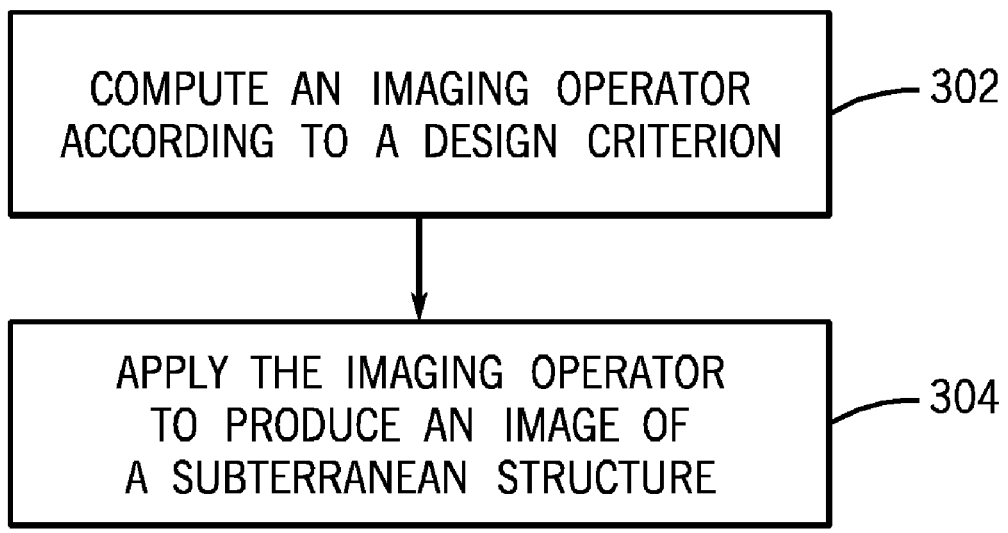
FIG. 3 is a flow diagram of a process of producing an imaging operator for imaging a subterranean structure, according to some embodiments.

FIG. 3 depicts a general flow diagram of a process according to some embodiments, which can be performed by the processing software 112 of FIG. 1, in some implementations. An imaging operator ($I_w$) is computed (at 302), where the imaging operator is defined at least in part by weights. The weights for the imaging operator are computed according to a design criterion, which is selected from among: (1) the imaging operator is configured to provide for a true amplitude image; (2) the imaging operator is configured to minimize mean square error; and (3) the imaging operator is configured to be a least squares inverse of a forward modeling operator. The imaging operator is then applied (at 304) to produce an image of the subterranean structure. As shown in FIG. 1, measurement data (M) is provided as input to the imaging operator ($I_w$), which produces an image, represented as $\hat{f}$.

Instructions of machine-readable instructions described above (including processing software of FIG. 112 in FIG. 1) are loaded for execution on one or more processors (e.g., 114 in FIG. 1). A processor can include a microprocessor, microcontroller, processor module or subsystem (including one or more microprocessors or microcontrollers), programmable integrated circuit, programmable gate array, or other control or computing device.

Data and instructions are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of providing an imaging operator for imaging a subterranean structure, comprising:
   computing, by one or more processors, at least one weight for designing the imaging operator according to a criterion, wherein the criterion is selected from the group consisting of: the imaging operator minimizes mean square error; and the imaging operator corresponds to a least squares inverse of a forward modeling operator; and
   applying, by the one or more processors, the imaging operator as defined by the computed at least one weight to produce an image of the subterranean structure.

2. The method of claim 1, wherein computing the at least one weight for the imaging operator is based on using a Gaussian beam representation that allows Gaussian beam migration.

3. The method of claim 2, further comprising using a midpoint-offset representation to model measurement data.

4. The method of claim 1, wherein computing the at least one weight comprises:
   defining a weighted adjoint operator that is a weighted version of an adjoint of the forward modeling operator, wherein the weighted adjoint operator is defined by the at least one weight, and wherein the imaging operator comprises the weighted adjoint operator.

5. The method of claim 1, wherein applying the imaging operator comprises applying measurement data as input to a filtering operator to produce the image, wherein the filtering operator is defined by the at least one weight.

6. A method of providing an imaging operator for imaging a subterranean structure, comprising:
   computing, by one or more processors, at least one weight for designing the imaging operator, wherein computing the at least one weight comprises:
     defining a weighted adjoint operator that is a weighted version of an adjoint of a forward modeling operator, wherein the weighted adjoint operator is defined by the at least one weight, wherein the imaging operator comprises the weighted adjoint operator, and wherein the weighted adjoint operator is a least squares inverse of the forward modeling operator for a noise-free scenario in which measurement data is noise free.

7. A method of providing an imaging operator for imaging a subterranean structure, comprising:
   computing, by one or more processors, at least one weight for designing the imaging operator, wherein computing the at least one weight comprises:
     defining a weighted adjoint operator that is a weighted version of an adjoint of a forward modeling operator, wherein the imaging operator comprises the weighted adjoint operator, and wherein the weighted adjoint operator has the at least one weight that is computed to minimize a mean square error for a noisy scenario in which measurement data is corrupted with additive noise.

8. The method of claim 7, further comprising:
using generalized semblance to simplify computation of the at least one weight.

9. The method of claim 8, further comprising:
approximating the generalized semblance using a signal power spectrum and signal plus noise spectrum, where the signal power spectrum and signal plus noise power spectrum are estimated based on measurement data.

10. A method of providing an imaging operator for imaging a subterranean structure, comprising:
computing, by one or more processors, at least one weight for designing the imaging operator according to a criterion, wherein the criterion is selected from the group consisting of: (1) the imaging operator provides for a true amplitude image; (2) the imaging operator minimizes mean square error; and (3) the imaging operator corresponds to a least squares inverse of a forward modeling operator; and
applying, by the one or more processors, the imaging operator as defined by the computed at least one weight to produce an image of the subterranean structure, wherein applying the imaging operator comprises applying measurement data as input to a filtering operator to produce the image, wherein the filtering operator is defined by the at least one weight, and wherein the filtering operator is a space-wavenumber-time-frequency filter.

11. A method of providing an imaging operator for imaging a subterranean structure, comprising:
computing, by one or more processors, at least one weight for designing the imaging operator according to a criterion, wherein the criterion is selected from the group consisting of: (1) the imaging operator provides for a true amplitude image; (2) the imaging operator minimizes mean square error; and (3) the imaging operator corresponds to a least squares inverse of a forward modeling operator; and
applying, by the one or more processors, the imaging operator as defined by the computed at least one weight to produce an image of the subterranean structure, wherein applying the imaging operator comprises applying measurement data as input to a filtering operator to produce the image, wherein the filtering operator is defined by the at least one weight, and wherein applying the imaging operator comprises applying an output of the filtering operator as input to an adjoint of a forward modeling operator to produce the image.

12. An article comprising at least one non-transitory computer-readable storage medium storing instructions that upon execution cause a computer to:
generate an imaging operator represented by at least one weight computed according to a design criterion specifying that the imaging operator is a least squares inverse of a forward modeling operator for a subterranean structure for a noise-free scenario in which measurement data is noise free; and
apply the imaging operator as defined by the computed at least one weight to produce an image of the subterranean structure, wherein applying the imaging operator is to perform Gaussian beam migration.

13. An article comprising at least one non-transitory computer-readable storage medium storing instructions that upon execution cause a computer to:
generate an imaging operator represented by at least one weight computed according to a design criterion specifying that the imaging operator minimizes a mean square error for a noisy scenario in which measurement data is corrupted with additive noise; and
apply the imaging operator as defined by the computed at least one weight to produce an image of a subterranean structure, wherein applying the imaging operator is to perform Gaussian beam migration.

14. The article of claim 13, wherein the instructions upon execution cause the computer to further:
use generalized semblance to compute the weights.

15. An article comprising at least one non-transitory computer-readable storage medium storing instructions that upon execution cause a computer to:
generate an imaging operator represented by at least one weight computed according to a design criterion, wherein the design criterion is selected from the group consisting of: (1) the imaging operator provides for a true amplitude image; (2) the imaging operator minimizes mean square error; and (3) the imaging operator corresponds to a least squares inverse of a forward modeling operator; and
apply the imaging operator as defined by the computed at least one weight to produce an image of a subterranean structure, wherein applying the imaging operator is to perform prestack depth migration.

16. A controller comprising:
one or more processors; and
instructions executable on the one or more processors to:
generate an imaging operator represented by at least one weight computed according to a design criterion, wherein the design criterion is selected from the group consisting of: the imaging operator minimizes mean square error; and the imaging operator corresponds to at least squares inverse of a forward modeling operator; and
apply the imaging operator as defined by the computed at least one weight to produce an image of a subterranean structure.

17. The computer of claim 15, wherein applying the imaging operator is to perform one of Gaussian beam migration and prestack depth migration.

* * * * *